(12) United States Patent
Navarro Cervera

(10) Patent No.: US 12,036,952 B2
(45) Date of Patent: Jul. 16, 2024

(54) UMBRELLA HOLDING ASSEMBLY

(71) Applicant: Ford Global Technologies, LLC, Dearborn, MI (US)

(72) Inventor: Cesar Navarro Cervera, Coacalco (MX)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/809,439

(22) Filed: Jun. 28, 2022

(65) Prior Publication Data
US 2023/0415660 A1    Dec. 28, 2023

(51) Int. Cl.
*B60R 7/12* (2006.01)
*B60R 11/00* (2006.01)

(52) U.S. Cl.
CPC ......... *B60R 7/12* (2013.01); *B60R 2011/0007* (2013.01)

(58) Field of Classification Search
CPC ..... B60R 7/12; B60R 2011/0007; B60R 7/04; B60R 7/06; B60R 7/08; B60R 2011/0003; B60R 2011/0005; B60R 2011/0019; B60R 2011/008; B60R 2011/0082; B60R 2011/0085; B60K 37/04
See application file for complete search history.

(56) References Cited

U.S. PATENT DOCUMENTS

| | | | |
|---|---|---|---|
| 6,003,926 A * | 12/1999 | Labeur | B60R 7/08 224/572 |
| 6,942,270 B1 * | 9/2005 | Mulvihill | B60R 7/02 224/543 |
| 7,708,329 B2 * | 5/2010 | Duller | B60R 7/005 296/37.16 |
| 8,205,926 B2 * | 6/2012 | Beckley | B60R 5/04 296/37.14 |
| 8,511,733 B2 * | 8/2013 | Blackmore | B60R 7/06 224/544 |

(Continued)

FOREIGN PATENT DOCUMENTS

| | | | |
|---|---|---|---|
| CN | 210707182 U | * | 6/2020 |
| GB | 2185225 A | | 7/1987 |

(Continued)

*Primary Examiner* — Amy R Weisberg
*Assistant Examiner* — Sara Laghlam
(74) *Attorney, Agent, or Firm* — Vichit Chea; Price Heneveld LLP

(57) ABSTRACT

An umbrella holding assembly includes a vehicle structure having a wall that defines an opening providing access to a receiving space, and a holder. The holder includes a receiving feature pivotably coupled to the vehicle structure and defining an inlet for receiving an umbrella. The receiving feature is operable to pivot relative to the vehicle structure through the opening from a first position to a second position. In the first position, the receiving feature is wholly within the receiving space. In the second position, the receiving feature is at least partially outside of the receiving space. The holder also includes a chute coupled to the receiving feature and operable to move relative to the receiving feature between retracted and extended positions. The holder further includes an end cap coupled to the chute distally from the receiving feature. The holder is movable between use and stowed conditions.

9 Claims, 4 Drawing Sheets

(56) References Cited

U.S. PATENT DOCUMENTS

| | | | |
|---|---|---|---|
| 9,421,916 B1* | 8/2016 | Dyle | ........................ B60R 7/04 |
| 10,870,396 B2* | 12/2020 | Tena Han | ................. B60R 7/12 |
| 11,440,479 B2* | 9/2022 | Salter | ....................... B60P 7/15 |
| 2010/0314495 A1* | 12/2010 | Dazet | ................ B64D 11/0696 |
| | | | 244/131 |
| 2021/0362657 A1* | 11/2021 | Aradom | .................. B60R 7/12 |

FOREIGN PATENT DOCUMENTS

| | | |
|---|---|---|
| GB | 2469946 A | 11/2010 |
| JP | 2006280862 A | 10/2006 |
| JP | 4150931 B2 | 9/2008 |
| KR | 19980023462 U | 7/1998 |
| KR | 20070035400 A | 3/2007 |
| KR | 100851572 B1 | 8/2008 |
| KR | 101048547 B1 | 7/2011 |
| KR | 20210073628 A | 6/2021 |

* cited by examiner

UMBRELLA HOLDING ASSEMBLY

FIELD OF THE DISCLOSURE

The present invention generally relates to an umbrella holding assembly. More specifically, the present invention relates to an umbrella holding assembly that is operably coupled to a vehicle structure.

BACKGROUND OF THE DISCLOSURE

Wet umbrellas are often stored on vehicle seats or within vehicle glove boxes. Moisture from the wet umbrellas may undesirably dampen the vehicle seats or other contents stored within the vehicle glove boxes. A designated storage space for a wet umbrella within a vehicle may be desired.

SUMMARY OF THE DISCLOSURE

According to a first aspect of the present invention, an umbrella holding assembly includes a vehicle structure having a wall that defines an opening that provides access to a receiving space, and a holder. The holder includes a receiving feature pivotably coupled to the vehicle structure and defining an inlet for receiving an umbrella. The receiving feature is operable to pivot relative to the vehicle structure through the opening from a first position to a second position. In the first position, the receiving feature is positioned wholly within the receiving space. In the second position, the receiving feature is positioned at least partially outside of the receiving space. The holder also includes a chute coupled to the receiving feature and operable to move relative to the receiving feature between a retracted position and an extended position. In the extended position, the chute defines a hollow that is in communication with the inlet. The holder further includes an end cap coupled to the chute distally from the receiving feature. The holder is movable between a use condition and a stowed condition. In the use condition, the receiving feature is in the second position, the chute is in the extended position, and the end cap is in a spaced relationship with the opening. In the stowed condition, the receiving feature is in the first position, the chute is in the retracted position, and the end cap covers the opening defined by the vehicle structure.

Embodiments of the first aspect of the invention can include any one or a combination of the following features:
  the end cap defines a drain hole and includes a stopper feature operable between a closed position, wherein the stopper feature is configured to generally prevent water from escaping through the drain hole, and an open position, wherein water is permitted to drain through the drain hole;
  the chute is configured to be compressed from the extended position to the retracted position, such that a distance between the receiving feature and the end cap in the extended position of the chute is greater than a distance between the receiving feature and the end cap in the retracted position of the chute;
  the chute comprises a corrugated conduit;
  the end cap includes an outer surface that is positioned opposite the hollow defined by the chute, wherein the outer surface is substantially flush with a portion of the wall of the vehicle structure adjacent to the opening in the stowed condition of the holder;
  the end cap further includes a protuberance that extends outward from the outer surface of the end cap, such that the protuberance is positioned outside of the receiving space in the stowed condition of the holder;
  the vehicle structure comprises a center console;
  the receiving space is defined by a recess formed by the vehicle structure; and
  the end cap is positioned vehicle-downward of the receiving feature in the use condition of the holder.

According to a second aspect of the present invention, a vehicle includes a center console having a wall that includes a recess that defines a receiving space, and a holder. The holder includes a receiving feature pivotably coupled to the center console and defining an inlet for receiving an umbrella. The receiving feature is operable to pivot relative to the center console from a first position to a second position. In the first position, the receiving feature is positioned wholly within the receiving space. In the second position, the receiving feature is positioned at least partially outside of the receiving space. The holder also includes a chute coupled to the receiving feature and operable to move relative to the receiving feature between a retracted position and an extended position. In the extended position, the chute defines a hollow that is in communication with the inlet. The holder further includes an end cap coupled to the chute distally from the receiving feature, defining a drain hole, and having a stopper feature operable between a closed position and an open position. In the closed position, the stopper feature is configured to generally prevent water from escaping through the drain hole. In the open position, water is permitted to drain through the drain hole. The holder is movable between a use condition and a stowed condition. In the use condition, the receiving feature is in the second position, the chute is in the extended position, and the end cap is in a spaced relationship with an opening to the receiving space defined by the center console. In the stowed condition, the receiving feature is in the first position, the chute is in the retracted position, and the end cap covers the opening.

Embodiments of the second aspect of the invention can include any one or a combination of the following features:
  the chute is configured to be compressed from the extended position to the retracted position, such that a distance between the receiving feature and the end cap in the extended position of the chute is greater than a distance between the receiving feature and the end cap in the retracted position of the chute;
  the chute comprises a corrugated conduit;
  the end cap includes an outer surface that is positioned opposite the hollow defined by the chute, wherein the outer surface is substantially flush with a portion of the wall of the center console adjacent to the opening in the stowed condition of the holder; and
  the end cap further includes a protuberance that extends outward from the outer surface of the end cap, such that the protuberance is positioned outside of the receiving space in the stowed condition of the holder.

According to a third aspect of the present invention, an umbrella holding assembly includes a vehicle structure having a wall that defines an opening that provides access to a receiving space, and a holder operably coupled to the vehicle structure and operable between a use condition and a stowed condition. In the use condition, the majority of the holder is positioned outside of the receiving space and the holder defines an elongated hollow configured to receive an umbrella therein. In the stowed condition, the majority of the holder is positioned within the receiving space.

Embodiments of the third aspect of the invention can include any one or a combination of the following features:

the holder is pivotably coupled with the vehicle structure and operable to move between the use and stowed conditions via at least pivotal movement relative to the vehicle structure;

the holder includes a chute and an end cap coupled to the chute, wherein, in the use condition of the holder, the chute defines the elongated hollow and the end cap is positioned further than the chute from the opening, and wherein, in the stowed condition, the chute is positioned within the receiving space and the end cap covers the opening;

the end cap includes an outer surface that is positioned opposite the elongated hollow defined by the chute, wherein the outer surface is substantially flush with a portion of the wall of the vehicle structure adjacent to the opening in the stowed condition of the holder;

the chute comprises a corrugated conduit; and the vehicle structure comprises a center console.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
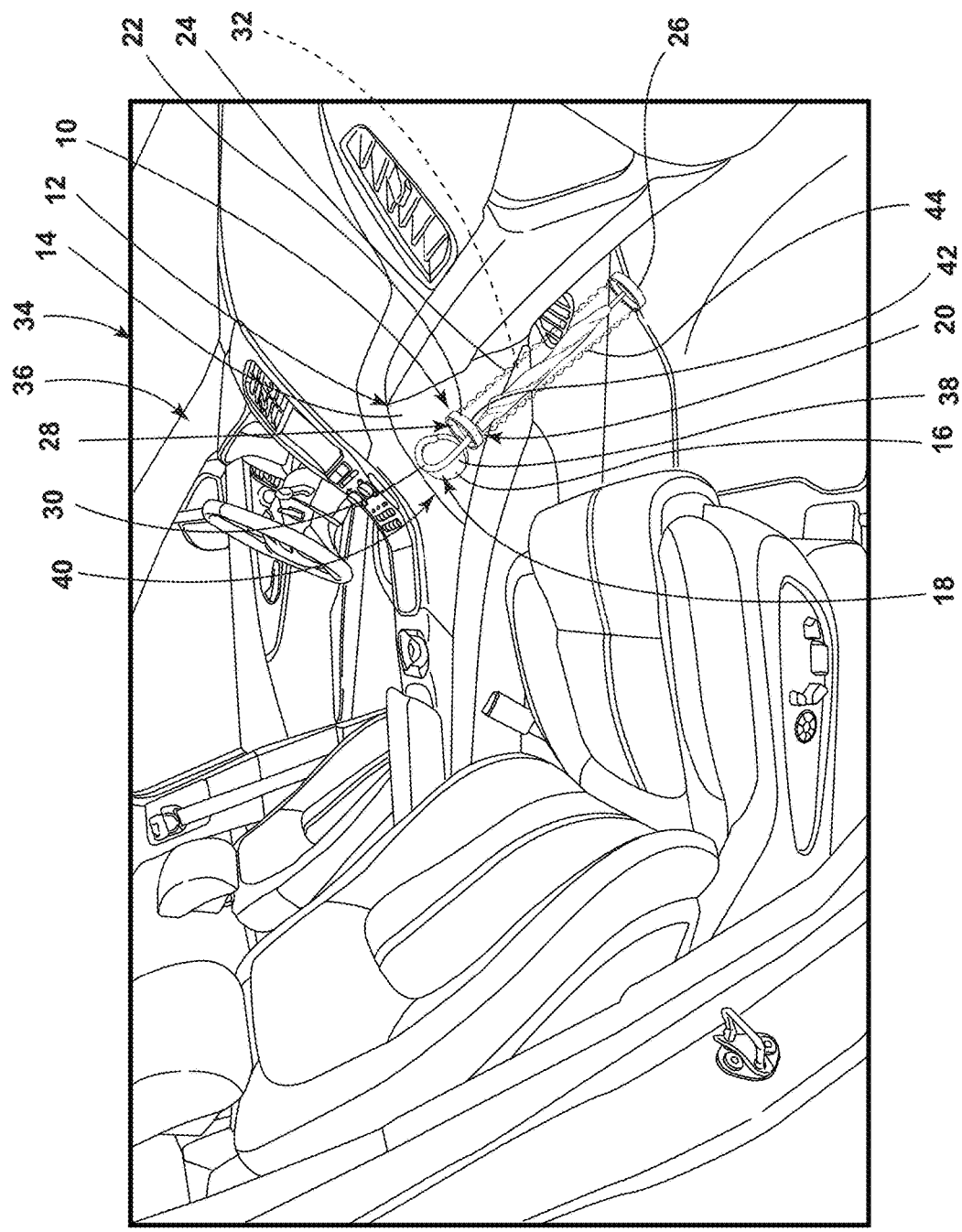
FIG. 1 is a top perspective view of a vehicle interior of a vehicle, illustrating an umbrella stored within a holder that is operably coupled with a center console of the vehicle, according to one embodiment.

Additional features and advantages of the invention will be set forth in the detailed description which follows and will be apparent to those skilled in the art from the description, or recognized by practicing the invention as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as "first" and "second," "top" and "bottom," and the like, are used solely to distinguish one entity or action from another entity or action, without necessarily requiring or implying any actual such relationship or order between such entities or actions.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and/or any additional intermediate members. Such joining may include members being integrally formed as a single unitary body with one another (i.e., integrally coupled) or may refer to joining of two components. Such joining may be permanent in nature, or may be removable or releasable in nature, unless otherwise stated.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein, the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring to FIGS. 1-7, an umbrella holding assembly 10 includes a vehicle structure 12. The vehicle structure 12 includes a wall 14 that defines an opening 16 that provides access to a receiving space 18. The umbrella holding assembly 10 further includes a holder 20. The holder 20 includes a receiving feature 22, a chute 24, and an end cap 26. The receiving feature 22 is pivotably coupled to the vehicle structure 12, and defines an inlet 28 for receiving an umbrella 30. The receiving feature 22 is operable to pivot relative to the vehicle structure 12 through the opening 16 from a first position to a second position. In the first position, the receiving feature 22 is positioned wholly within the receiving space 18. In the second position, the receiving feature 22 is positioned at least partially outside of the receiving space 18. The chute 24 is coupled to the receiving feature 22 and is operable to move relative to the receiving feature 22 between a retracted position and an extended position. In the extended position, the chute 24 defines a hollow 32 that is in communication with the inlet 28. The end cap 26 is coupled to the chute 24 distally from the receiving feature 22. The holder 20 is movable between a use condition and a stowed condition. In the use condition, the receiving feature 22 is in the second position, the chute 24 is in the extended position, and the end cap 26 is in a spaced relationship with the opening 16. In the stowed condition, the receiving feature 22 is in the first position, the chute 24 is in the retracted position, and the end cap 26 covers the opening 16 defined by the vehicle structure 12.

Referring now to FIG. 1, a vehicle 34 includes a vehicle interior 36. A vehicle structure 12 is disposed within the vehicle interior 36. The vehicle structure 12 can include the wall 14. The wall 14 of the vehicle structure 12 can define the opening 16 that provides access to the receiving space 18. In some embodiments, the receiving space 18 is defined by a recess 38 that is formed by the vehicle structure 12. In the embodiment illustrated in FIG. 1, the vehicle structure 12 is a center console 40 of the vehicle 34. As illustrated, the center console 40 includes the wall 14 that defines the opening 16 that provides access to the receiving space 18, which is defined by the recess 38 formed by the center console 40 of the vehicle 34. A variety of vehicle structures 12 are contemplated (e.g., door panel, instrument panel, seating assembly, etc.). Further, it is contemplated that the opening 16 defined by the wall 14 of the vehicle structure 12 can be an aperture that extends through the wall 14 to provide access to the receiving space 18 that is defined by the vehicle structure 12.

Figure 3:
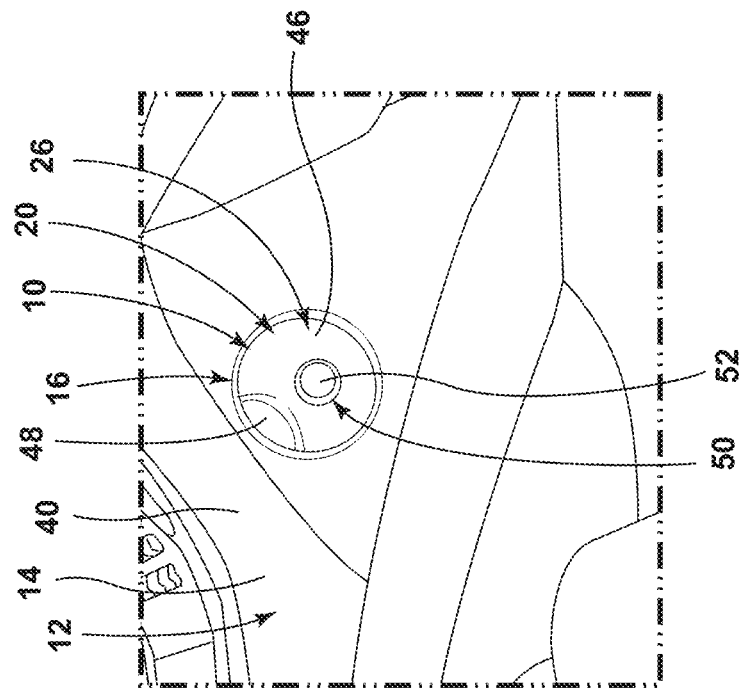
FIG. 3 is an enlarged view of portion III of FIG. 2, illustrating an end cap of the holder in the stowed condition of the holder, according to one embodiment.
Figure 2:
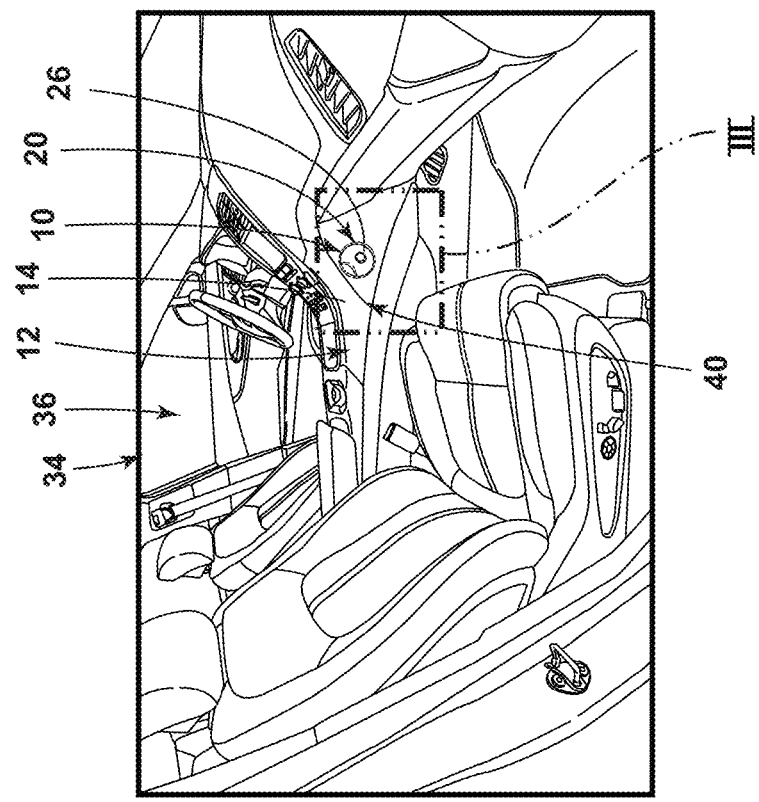
FIG. 2 is a top perspective view of the vehicle interior of the vehicle, illustrating the holder operably coupled to the center console in a stowed condition, according to one embodiment.
Figure 4:
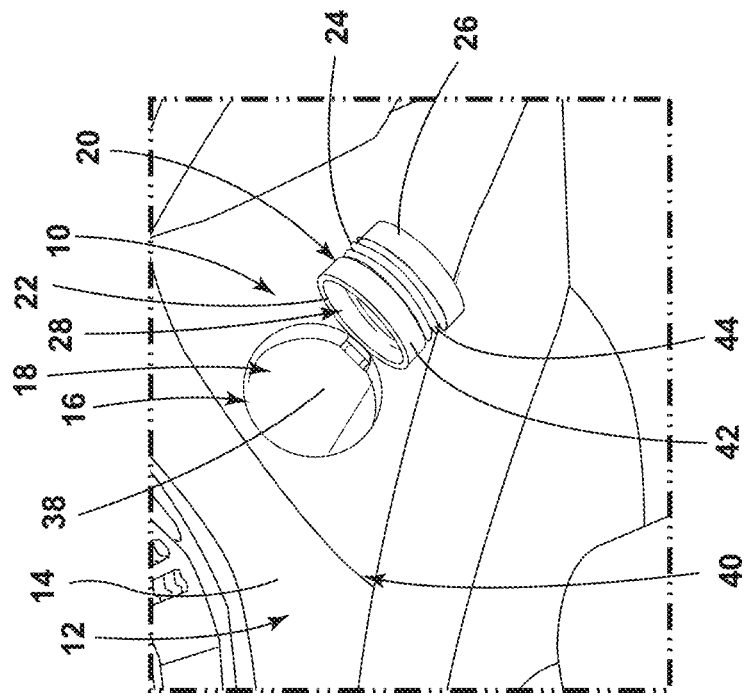
FIG. 4 is a top perspective view of the vehicle interior of the vehicle, illustrating a receiving feature, a chute, and the end cap of the holder with the receiving feature pivoted outward relative to the center console, such that the majority of the holder is positioned outside of a receiving space defined by the center console, according to one embodiment.
Figure 5:
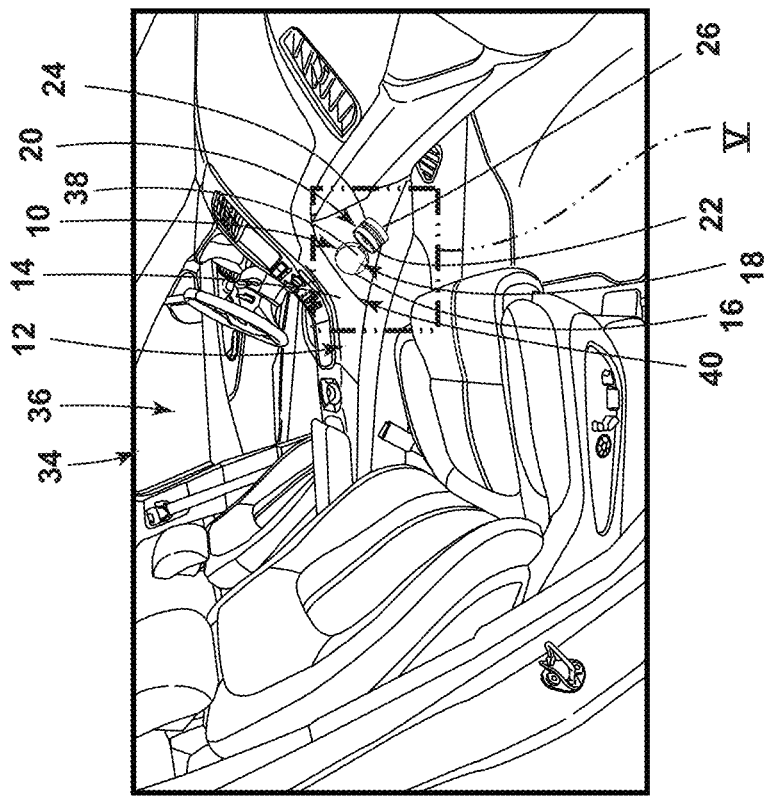
FIG. 5 is an enlarged view of area V of FIG. 4, illustrating the receiving feature of the holder pivoted relative to the center console, such that the majority of the holder is positioned outside of the receiving space defined by the center console, according to one embodiment.
Figure 7:
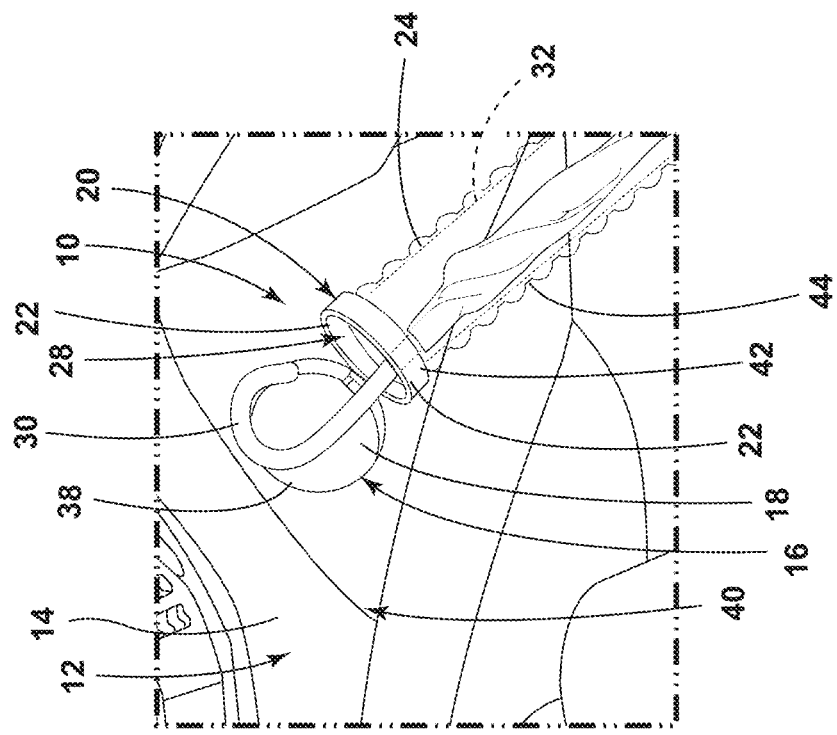
FIG. 7 is an enlarged view of area VII of FIG. 6, illustrating the holder in the use condition, according to one embodiment.
Figure 6:
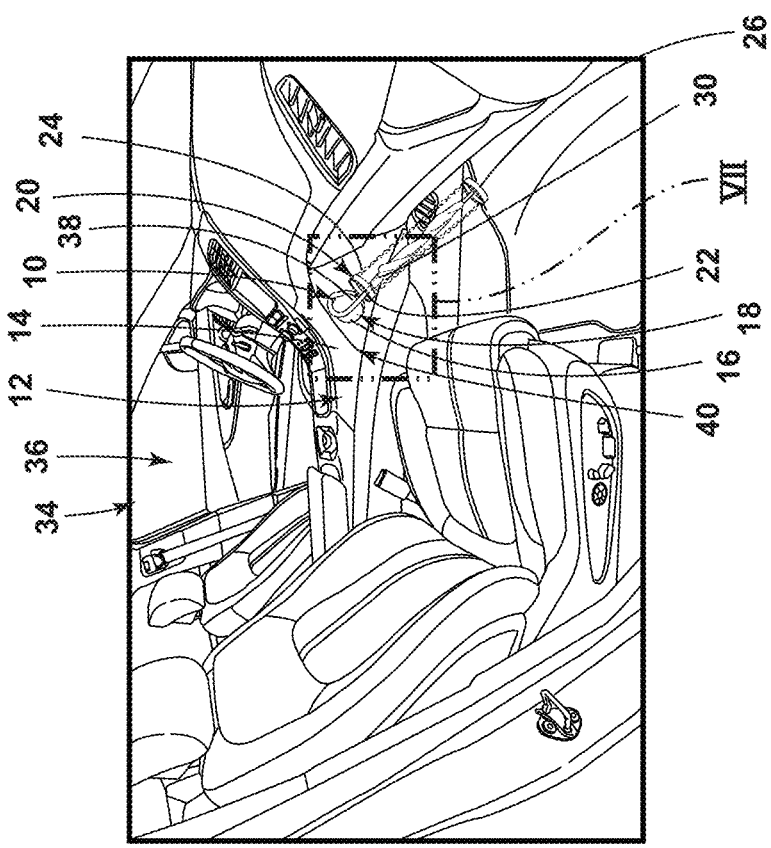
FIG. 6 is a top perspective view of the vehicle interior of the vehicle, illustrating the holder in a use condition and an umbrella disposed within a hollow defined by the holder, according to one embodiment.

Referring now to FIGS. 1-7, the umbrella holding assembly 10 includes the holder 20. The holder 20 is configured to hold the umbrella 30, as illustrated in FIG. 1. The holder 20 can be operable between the use condition and the stowed condition. In various embodiments, in the use condition of the holder 20, the majority of the holder 20 is positioned outside of the receiving space 18 defined by the vehicle structure 12, as illustrated in FIGS. 1, 6, and 7. In the stowed condition of the holder 20, the majority of the holder 20 is positioned within the receiving space 18. For example, as illustrated in FIGS. 2 and 3, the end cap 26 of the holder 20 covers the opening 16 defined by the vehicle structure 12, and the chute 24 and the receiving feature 22 are disposed within the receiving space 18, as described further herein. In some implementations, in the use condition, the holder 20 defines the hollow 32 that is configured to receive the umbrella 30 therein. In various embodiments, the hollow 32 is an elongated hollow, as illustrated in FIGS. 1 and 6. In various embodiments, the holder 20 is pivotably coupled with the vehicle structure 12 and is operable to move between the use and stowed conditions via at least pivotal movement of the holder 20 relative to the vehicle structure 12.

Referring still to FIGS. 1-7, in some embodiments, the holder 20 includes the receiving feature 22. The receiving feature 22 can be pivotably coupled to the vehicle structure 12. As such, the holder 20 may be operable to move between the use condition and the stowed condition via at least pivotal movement of the receiving feature 22 relative to the vehicle structure 12. In various embodiments, the receiving feature 22 is pivotably coupled to the vehicle structure 12 within the receiving space 18 defined by the vehicle structure 12. In various implementations, the receiving feature 22 defines an inlet 28 for receiving the umbrella 30 therethrough. For example, as illustrated in FIGS. 1 and 4-7, the receiving feature 22 includes a ring 42 that defines the inlet 28. The width and/or diameter of the ring 42 is smaller than the width and/or diameter of the opening 16 defined by the vehicle structure 12, such that the ring 42 may be fit through the opening 16 and be moved into and out of the receiving space 18 defined by the vehicle structure 12. It is contemplated that the receiving feature 22 may be a variety of shapes in various embodiments.

Referring now to FIGS. 2-7, the receiving feature 22 is operable to pivot relative to the vehicle structure 12 through the opening 16 from the first position, as illustrated in FIGS. 2 and 3, to the second position, as illustrated in FIGS. 4-7. In the first position, the receiving feature 22 is positioned wholly within the receiving space 18 defined by the vehicle structure 12. In the embodiment illustrated in FIGS. 2 and 3, the receiving feature 22 is disposed within the recess 38 defined by the center console 40, and the end cap 26 covers the opening 16, such that the receiving feature 22 is concealed within the receiving space 18. In the second position, the receiving feature 22 is positioned at least partially outside of the receiving space 18. In the embodiments illustrated in FIGS. 4-7, the receiving feature 22 is positioned outside of the receiving space 18, such that the inlet 28 is exposed for receiving an umbrella 30 therethrough.

Referring now to FIGS. 1-7, the holder 20 can include the chute 24. The chute 24 is coupled to the receiving feature 22 and is operable to move relative to the receiving feature 22 between a retracted position, as illustrated in FIGS. 4 and 5, and an extended position, as illustrated in FIGS. 6 and 7. In the extended position, the chute 24 defines the hollow 32 that is in communication with the inlet 28 of the receiving feature 22. As illustrated in FIGS. 6 and 7, the chute 24 defines the elongated hollow 32 in the extended position of the chute 24. In various embodiments, the chute 24 is operable to be compressed from the extended position to the retracted position, such that a distance between the receiving feature 22 and the end cap 26 of the holder 20 in the extended position of the chute 24 is greater than a distance between the receiving feature 22 and the end cap 26 in the retracted position of the chute 24. In some embodiments, the chute 24 comprises a corrugated conduit 44. For example, as illustrated in FIGS. 5 and 7, the chute 24 is a corrugated conduit 44 that includes a plurality of directionally-alternating folds that can be compressed, as illustrated in FIG. 5, and extended, as illustrated in FIG. 7, in an accordion-style manner to move the chute 24 between the extended and retracted positions. It is contemplated that the chute 24 can be formed of a variety of materials and can move between the extended and retracted positions in a variety of manners. For example, the chute 24 may unfurl, telescopically extend and retract, unfold, and/or deform to move between the extended and retracted positions, in various embodiments.

Referring now to FIGS. 2-7, the holder 20 can include the end cap 26. The end cap 26 can be coupled to the chute 24 distally from the receiving feature 22, as illustrated in FIGS. 4-6. In other words, the chute 24 may extend from the receiving feature 22 at a first end of the chute 24 to the end cap 26 at a second end of the chute 24. The end cap 26 includes an outer surface 46 that is positioned opposite the hollow 32 defined by the chute 24. As illustrated in FIG. 3, the end cap 26 includes a protuberance 48 that extends outward from the outer surface of the end cap 26. In some embodiments, the end cap 26 can define a drain hole 50. In operation, the drain hole 50 may allow water that is accumulated within the hollow 32 to drain out of the holder 20. The end cap 26 can further include a stopper feature 52. The stopper feature 52 is operable between a closed position, wherein the stopper feature 52 is configured to generally prevent water from escaping through the drain hole 50, and an open position, wherein water is permitted to drain through the drain hole 50. A variety of types of stopper features 52 are contemplated (e.g., valve, plug, etc.).

Referring now to FIGS. 2, 3, 6, and 7, the holder 20 is movable between the use condition and the stowed condition. In the use condition, the receiving feature 22 is in the second position, as illustrated in FIGS. 6 and 7. In the stowed condition, the receiving feature 22 is in the first position, as illustrated in FIGS. 2 and 3. In the use condition, the chute 24 is in the extended position, as illustrated in FIGS. 6 and 7. In the stowed condition, the chute 24 is in the retracted position. For example, in the embodiments illustrated in FIGS. 2 and 3, the chute 24 is disposed within the receiving space 18 defined by the vehicle structure 12 and is concealed by the end cap 26.

Referring still to FIGS. 2, 3, 6, and 7, in the use condition, the end cap 26 is in a spaced relationship with the opening 16, as illustrated in FIG. 6. Further, the end cap 26 is positioned further than the chute 24 from the opening 16 in the use condition of the holder 20. In various embodiments, the end cap 26 is positioned vehicle-downward of the receiving feature 22 in the use condition of the holder 20. For example, as illustrated in FIG. 6, the end cap 26 is positioned vehicle-downward and vehicle-forward of the receiving feature 22 in the use condition of the holder 20.

In the stowed condition of the holder 20, the end cap 26 covers the opening 16 defined by the wall 14 of the vehicle structure 12, as illustrated in FIGS. 2 and 3. In some embodiments, the outer surface 46 of the end cap 26 can be substantially flush with a portion of the wall 14 of the vehicle structure 12 that is adjacent to the opening 16 in the stowed condition of the holder 20. In various embodiments, surfaces may be flush with each other when the surfaces are coplanar with each other. It is contemplated that curved surfaces may be flush with each other in addition to coplanar surfaces being flush with each other. For example, two curved surfaces that are aligned with each other at adjacent edges may be flush with each other. In some embodiments, the end cap 26 may be frictionally engaged with the opening-defining portions of the wall 14 of the vehicle structure 12, such that friction between the wall 14 and the end cap 26 yieldingly maintains the end cap 26 in position while the holder 20 is in the stowed condition. As illustrated in FIG. 3, the protuberance 48 extends outward from the outer surface 46 of the end cap 26 and is positioned outside of the receiving space 18 in the stowed condition of the holder 20. In the illustrated embodiment, the protuberance 48 is disposed proximate to the wall 14 in the stowed condition of the holder 20, and provides a handhold for a user to move the holder 20 toward the use condition.

In an exemplary embodiment of the umbrella holding assembly 10, the vehicle 34 includes the center console 40. The center console 40 includes the wall 14 that includes the recess 38 which defines the receiving space 18. The holder 20 includes the receiving feature 22 that defines the inlet 28 and is pivotably coupled to the center console 40, the chute 24 that is coupled to the receiving feature 22 and operable to move relative to the receiving feature 22 between the retracted position and the extended position, and the end cap 26 that is coupled to the chute 24 distally from the receiving feature 22. The end cap 26 defines the drain hole 50 and includes the stopper feature 52 that is operable between the closed and open positions.

In operation of the exemplary embodiment of the umbrella holding assembly 10, initially, the holder 20 is in the stowed condition, such that the receiving feature 22 is disposed wholly within the receiving space 18, the chute 24 is in the retracted position and disposed within the receiving space 18, and the end cap 26 covers the opening 16 defined by the wall 14 of the center console 40. Next, the user, desiring to store an umbrella 30, utilizes the protuberance 48 of the end cap 26 to pivot the receiving feature 22 from the first position, as illustrated in FIGS. 2 and 3, to the second position, as illustrated in FIGS. 3 and 4. Next, the user thrusts the umbrella 30 into the inlet 28 defined by the receiving feature 22. The force exerted onto the chute 24 and/or end cap 26 by the umbrella 30 causes the chute 24 to decompress from the retracted position, as illustrated in FIGS. 4 and 5, to the extended position, as illustrated in FIGS. 6 and 7. As such, the holder 20 enters the use condition, as illustrated in FIGS. 6 and 7, and the umbrella 30 is stored within the hollow 32 defined by the holder 20. Once the water has drained off of the exterior of the umbrella 30 and has pooled against the end cap 26, the user moves the stopper feature 52 from the closed position to the open position to allow the water to drain out of the hollow 32 defined by the holder 20. When exiting the vehicle 34, the user removes the umbrella 30 from the holder 20, and returns the holder 20 to the stowed condition.

The umbrella holding assembly 10 of the present disclosure can provide a variety of advantages. First, the stowable nature of the holder 20 within the vehicle structure 12 enhances the aesthetics of the vehicle interior 36 and optimizes space utilization within the vehicle 34. Second, the chute 24 being a corrugated conduit 44 can allow the chute 24 to accommodate umbrellas 30 of varying sizes by decompressing varying amounts based on the size of the umbrella 30 received therein. Third, the drain hole 50 and stopper feature 52 of the end cap 26 conveniently allow water to be selectively drained from the holder 20 when desired.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle, comprising:
   a center console having a wall that includes a recess that defines a receiving space; and
   a holder, comprising:
      a receiving feature pivotably coupled to the center console and defining an inlet for receiving an umbrella, wherein the receiving feature is operable to pivot relative to the center console from a first position, wherein the receiving feature is positioned wholly within the receiving space, to a second position, wherein the receiving feature is positioned at least partially outside of the receiving space;
      a chute coupled to the receiving feature and operable to move relative to the receiving feature between a retracted position and an extended position, wherein the chute defines a hollow that is in communication with the inlet; and
      an end cap coupled to the chute distally from the receiving feature, defining a drain hole, and having a stopper feature operable between a closed position, wherein the stopper feature is configured to generally prevent water from escaping through the drain hole, and an open position, wherein water is permitted to drain through the drain hole, the holder being movable between a use condition, wherein the receiving feature is in the second position, the chute is in the extended position, and the end cap is in a spaced relationship with an opening to the receiving space defined by the center console, and a stowed condition, wherein the receiving feature is in the first position, the chute is in the retracted position, and the end cap covers the opening.

2. The vehicle of claim 1, wherein the chute is configured to be compressed from the extended position to the retracted position, such that a distance between the receiving feature and the end cap in the extended position of the chute is greater than a distance between the receiving feature and the end cap in the retracted position of the chute.

3. The vehicle of claim 2, wherein the chute comprises:
a corrugated conduit.

4. The vehicle of claim 1, wherein the end cap includes an outer surface that is positioned opposite the hollow defined by the chute, wherein the outer surface is substantially flush with a portion of the wall of the center console adjacent to the opening in the stowed condition of the holder.

5. The vehicle of claim 4, wherein the end cap further includes a protuberance that extends outward from the outer surface of the end cap, such that the protuberance is positioned outside of the receiving space in the stowed condition of the holder.

6. An umbrella holding assembly, comprising:
a vehicle structure having a wall that defines an opening that provides access to a receiving space, wherein the vehicle structure comprises a center console; and
a holder pivotably coupled to the vehicle structure and operable between a use condition, wherein the majority of the holder is positioned outside of the receiving space and the holder defines an elongated hollow configured to receive an umbrella therein, and a stowed condition, wherein the majority of the holder is positioned within the receiving space.

7. The umbrella holding assembly of claim 6, wherein the holder includes a chute and an end cap coupled to the chute, wherein, in the use condition of the holder, the chute defines the elongated hollow and the end cap is positioned further than the chute from the opening, and wherein, in the stowed condition, the chute is positioned within the receiving space and the end cap covers the opening.

8. The umbrella holding assembly of claim 7, wherein the end cap includes an outer surface that is positioned opposite the elongated hollow defined by the chute, wherein the outer surface is substantially flush with a portion of the wall of the vehicle structure adjacent to the opening in the stowed condition of the holder.

9. The umbrella holding assembly of claim 7, wherein the chute comprises:
a corrugated conduit.

* * * * *